July 26, 1927.

J. W. WHITE

LOCKING MECHANISM

Filed Nov. 24, 1922

1,637,248

Inventor
JOHN W. WHITE.
By
Clarence S. Walker.
His Attorney

Patented July 26, 1927.

1,637,248

UNITED STATES PATENT OFFICE.

JOHN W. WHITE, OF BUFFALO, NEW YORK.

LOCKING MECHANISM.

Application filed November 24, 1922. Serial No. 603,078.

This invention relates to an improvement in a locking mechanism and more particularly to means for locking a rigid rotatable member in contact with a yieldable member.

The primary object of this invention is to provide such a locking effect by indenting the engaging surfaces of both the rigid and the yieldable member so that the parts will be held in rigid contact without the provision of any supplementary means.

Other objects reside in certain particular details of construction which will appear from a consideration of the following description taken in connection with the accompanying drawing which forms a part thereof and in which, Figure 1 is a side elevation of a portion of a disc wheel in which this invention is embodied.

Figure 1:
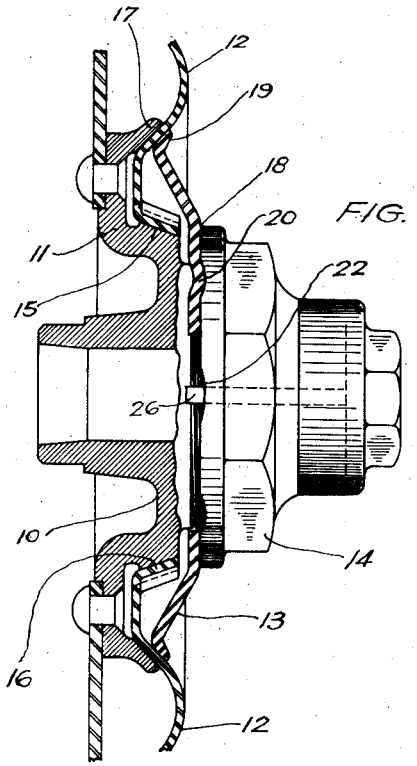
Figure 3:
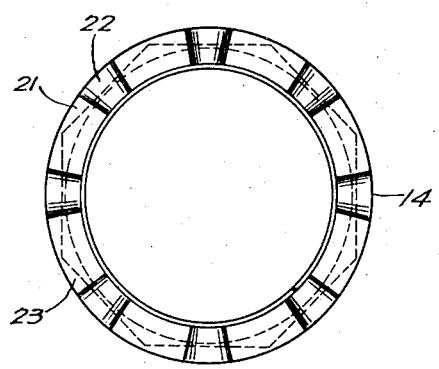
Figure 3 is a bottom plan view of the locking nut and Figure 4 is a view similar to Fig. 1 illustrating the relation of the parts when the locking nut first contacts with the annular plate.

Referring to the drawings the reference numeral 10 is employed to designate a disc wheel which comprises a hub 11, a disc 12, an annular plate 13 and a locking nut 14.

The disc may be seated upon the hub 11 in any desired form. In the present embodiment the hub has an inclined shoulder 15 which receives the flange, or inner periphery 16 of the disc 12. The hub 11 has also an outwardly inclined flange 17 against which a portion of the disc 12 is held by plate 13 which bears against the disc substantially in alignment with the flange 17, and which is in turn held in place by means of locking nut 14 threaded upon the hub 11. The plate 13 is substantially conical, having an inner flange 18 against which the locking nut 14 bears and an outer flange 19' which contacts with the disc.

By tightening the nut 14 upon the threaded inner hub it will be observed that the plate forces the disc against the flange 17 and as the plate 13 is yieldable it is obvious that as the tightening of the nut proceeds the plate will fulcrum at its contact with the disc 12 and the flange 18 will be forced inwardly, thus placing the plate under lateral tension. In order to hold the parts in this position and prevent any relative rotative movement of either without the use of any additional element the face of the flange 18 is waved, either by providing a series of alternate depressions 19 and raised portions or expressions 20 or by forming the raised portions 20 above; the parts designated as 19 being the original surface of the flange. Since the plate by reason of its construction is yieldable these waves can easily be provided by stamping. The inner face 21 of the nut 14 which contacts with the flange 18 is also provided with a corresponding number of depressions 22 preferably by the use of a coining stamp.

Obviously when the nut 14 is turned on the hub 11 into contact with the flange 18 the expressions 20 will enter and leave the depressions 22. As the tightening action of the nut is continued the sides of the depressions 22 and the surface 23 of the face 21 will press against the sides of the expressions 20 and depress the flange 18 so that the nut 14 can continue to turn relatively to it. This movement of the flange 18 is due to the turning of the plate 13 as a whole on the flange 17 and as the tightening action continues, it is obvious that the outward resistance of the plate to this inward movement will increase until it is impossible to free the depressions 22 from the expressions 20. When this takes place the expressions 20 in the depressions 22, will resist any rotative movement of the nut relative to the plate regardless of the direction due to their interengagement and also due to the tension of the plate. Experiments have shown that it requires substantially as much force to loosen the nut under this condition as it took to tighten it.

Figure 4:
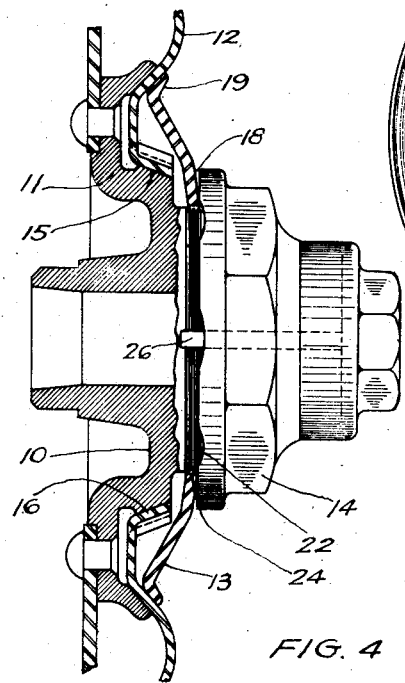
Figure 2:
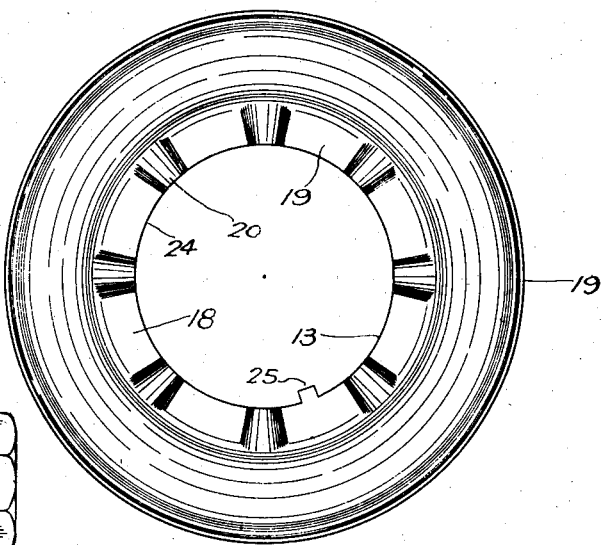
Figure 2 is a front elevation of the annular plate forming part of the wheel.

In order to reduce the initial surface friction to a minimum the inner edge 24 of the flange is slightly tapered so that the nut bears against this portion first. (See Fig. 4.) As the nut, however, is tightened the flange 18 will be pressed inward until the face 21 of the nut will bear entirely against the flange 18, thereby securing maximum friction.

It has been found in actual practice, that after the nut has been tightened any tendency of the disc 12, to turn, relative to the flange 17, is transmitted through the plate 13 to the nut 14, in other words that the plate and nut move as a unit with the disc. Thus the only resistance to that movement on the outer side of the disc is the friction of the threads of the nut on the hub. The area of this resistance surface is of course much less than that of the flange 17 which represents the chief resistance on the inner side of the disc and in order to increase such resistance surface it may be found advisable to provide means to prevent the plate from shifting on the hub. This may be done in any suitable manner but it is preferred to provide on the flange 18 of the plate 13 a tongue 25 which will engage a keyway 26 in the hub. With this construction the plate is held against any rotation with the disc and consequently the contacting face of the flange 19 will form a resisting surface which will coact with the flange 17 to hold the disc against any tendency to shift.

As above pointed out this locking action takes place between a rigid member and a yieldable member and consequently may be employed wherever it is desired to prevent relative rotation between the members.

While one embodiment only has been illustrated and described I am not to be limited thereto since other embodiments may be made without departing from the spirit and scope of my invention as set forth in the following claims.

Having thus set forth my invention what I claim as new and for which I desire the protection of Letters Patent is—

1. Locking mechanism for connecting the disc of a disc wheel to the hub thereof comprising an annular plate and a nut on said hub contacting with said plate, means including depressions and expressions upon the contacting surfaces of said plate and nut for preventing relative rotative movement therebetween when the disc is firmly positioned upon said hub, the periphery of the plate adjacent the hub being tapered outwardly whereby said nut contacts initially with the edge alone.

2. Locking mechanism for connecting the disc of a disc wheel to the hub thereof comprising an annular plate and a nut on said hub contacting with said plate, the contacting surface of the plate being provided with a series of equally spaced expressions and the contacting surface of the nut being provided with a similar series of depressions.

3. Locking mechanism for connecting the disc of a disc wheel to the hub thereof comprising an annular plate and a nut on said hub contacting with said plate, means for holding said plate against rotation on said hub, comprising a tongue on said plate and a keyway in said hub with which said tongue engages and means functioning when said nut is tightened against said plate for preventing relative rotative movement of said plate and said nut.

In testimony whereof I affix my signature.

JOHN W. WHITE.